(12) United States Patent
Herrig

(10) Patent No.: US 10,830,369 B2
(45) Date of Patent: Nov. 10, 2020

(54) ELECTRIC DRIVE PIVOTING VALVE DEVICE

(71) Applicant: Festo SE & Co. KG, Esslingen (DE)

(72) Inventor: Martin Herrig, Dettingen (DE)

(73) Assignee: FESTO SE & Co. KG, Esslingen (DE)

( * ) Notice: Subject to any disclaimer, the term of this patent is extended or adjusted under 35 U.S.C. 154(b) by 206 days.

(21) Appl. No.: 15/879,604

(22) Filed: Jan. 25, 2018

(65) Prior Publication Data

US 2018/0216748 A1 Aug. 2, 2018

(30) Foreign Application Priority Data

Jan. 27, 2017 (DE) .................. 10 2017 201 316

(51) Int. Cl.
| | |
|---|---|
| F16K 31/06 | (2006.01) |
| F16K 31/08 | (2006.01) |
| F15B 13/043 | (2006.01) |
| F15B 13/044 | (2006.01) |
| F16K 7/16 | (2006.01) |
| F16K 11/02 | (2006.01) |
| H01F 7/16 | (2006.01) |

(52) U.S. Cl.
CPC .......... *F16K 31/06* (2013.01); *F15B 13/0438* (2013.01); *F15B 13/0446* (2013.01); *F16K 7/16* (2013.01); *F16K 11/02* (2013.01); *F16K 31/0682* (2013.01); *F16K 31/082* (2013.01); *H01F 7/16* (2013.01)

(58) Field of Classification Search
None
See application file for complete search history.

(56) References Cited

U.S. PATENT DOCUMENTS

| | | | | |
|---|---|---|---|---|
| 4,771,204 A | * | 9/1988 | Siegal | ........................ F16K 7/14 |
| | | | | 137/831 |
| 2003/0226601 A1 | * | 12/2003 | Frisch | ................. F16K 31/0682 |
| | | | | 137/625.65 |

FOREIGN PATENT DOCUMENTS

| | | |
|---|---|---|
| DE | 69219877 | 9/1997 |
| JP | 63106403 A * | 5/1988 |
| WO | WO9857081 | 12/1998 |
| WO | WO2009097868 | 8/2009 |

OTHER PUBLICATIONS

Translation EPO, JPS 63106403, 1989 (Year: 1989).*

* cited by examiner

*Primary Examiner* — Daphne M Barry
(74) *Attorney, Agent, or Firm* — Hoffmann & Baron, LLP

(57) ABSTRACT

A valve device with a valve housing, which is penetrated by a fluid channel, which extends from an inlet connection to an outlet opening and in which a valve member is arranged, which is designed to regulate a cross-section of the fluid channel, with an electric drive device to influence a position of the valve member in the fluid channel including a stator that is fixed on the valve housing and an armature arranged so as to be movable relative to the stator wherein the armature and the valve member are arranged on a dimensionally-stable connection part, which is pivotably mounted on the valve housing with a flexure, wherein the flexure is designed for an electric connection of the armature to an electric connection device designed on the valve housing and wherein the connection part forms the valve member or carries the valve member.

10 Claims, 4 Drawing Sheets

ELECTRIC DRIVE PIVOTING VALVE DEVICE

BACKGROUND OF THE INVENTION

The invention relates to a valve device for influencing a fluid current between an inlet connection and an outlet opening, with a valve housing, which is penetrated by a fluid channel, which extends from an inlet connection to an outlet opening, wherein a valve member is arranged in the fluid channel, which is designed to regulate a cross-section of the fluid channel, with an electric drive device, which is designed to influence a position of the valve member in the fluid channel and which comprises a stator that is fixed on the valve housing and an armature arranged so as to be movable relative to the stator.

An instrument transformer with a coil winding for generating a magnetic field is known from DE 692 19 877 T2, which has a magnet in order to effect a pivot movement in response to the magnetic field of the coil winding, wherein the coil winding is received in a housing, which has a separating wall in order to form two housing edges insulated from each other, wherein the housing has a depression located in the separating wall, said depression has side walls and a base wall as well as with a bearing, which is connected to the magnet in order to enable a pivot movement of the magnet about an axis extending through the magnet in response to the magnetic field and a bearing holder arrangement to which the at least one bearing is connected in order to hold the magnet and the at least one bearing in the space surrounded by the coil winding in a suspended manner, wherein the magnet is held in a suspended manner in one of the chambers by the bearing holder arrangement and the winding is arranged in the other chamber around the depression.

SUMMARY OF THE INVENTION

The object of the invention is to provide a valve device which can be operated with a low amount of energy.

This object is achieved with a valve device for influencing a fluid current between an inlet connection and an outlet opening, with a valve housing, which is penetrated by a fluid channel, which extends from an inlet connection to an outlet opening, wherein a valve member is arranged in the fluid channel, which is designed to regulate a cross-section of the fluid channel, with an electric drive device, which is designed to influence a position of the valve member in the fluid channel and which comprises a stator that is fixed on the valve housing and an armature arranged so as to be movable relative to the stator, wherein the armature and the valve member are arranged on a dimensionally-stable connection part, which is pivotably mounted on the valve housing with at least one flexure, wherein the at least one flexure is designed for an electric connection of the armature to an electric connection device located on the valve housing and wherein the connection part forms the valve member or carries the valve member.

The flexure is given a dual function as, on the one hand, it serves for the pivotable and play-free bearing of the connection part on the valve housing and, on the other hand, it is designed for an electric connection of the armature to a connection device in order to be able to provide electric energy to the armature. The flexure is preferably made of a metallic material, in particular a spring-elastic material. In an advantageous embodiment, the flexure is dimensioned such that it specifies a predefinable pivot position for the connection part with respect to the valve housing in the absence of an electric supply of the armature. This ensures that the valve device is located in a clear or well-defined fluidic switch state without an electric voltage supply. It is particularly preferred for the valve member located on the dimensionally-stable connection part to enable a maximum cross-section of the fluid channel without an electric supply of the armature and can be moved, with provision of an electric supply to the armature, from this opening position, preferably in a stepless or freely setable manner, in particular proportional to a predefinable current flow through the armature, into a closure position in which a reduction of the cross-section of the fluid channel, in particular blocking of the fluid channel can be achieved. For example, the connection part is designed as a valve member such that a cross-section of the fluid channel is directly influenced by the connection part by way of a pivot movement of the connection part about a pivot axis determined by the flexure. Alternatively, a valve member, in particular a rubber-elastic seal is arranged on the connection part, said seal influences the cross-section of the fluid channel as a function of the pivot movement of the connection part.

Advantageous further developments of the invention are the subject matter of the dependent claims.

It is expedient for a first section of the fluid channel to be designed proceeding from the inlet connection as a recess in a channel socket, which protrudes into a valve space and which has a discharge opening arranged opposite the valve member and for a second section of the fluid channel to be designed as a valve space in which the drive device, the connection part, the valve member and the at least one flexure are arranged and into which the channel socket protrudes. In this case, an end surface of the channel socket arranged opposite the valve member and penetrated by the discharge opening of the first section of the fluid channel forms a valve seat on which the valve member can abut in a sealing manner as a function of the pivot position of the connection part in order to block the fluid channel or can be arranged at a distance to the discharge opening in order to release the fluid channel.

It is advantageous for the end surface of the channel socket arranged opposite the valve member and penetrated by the discharge opening to be adapted to the pivotable valve member such that in a closure position of the valve member, an extensively sealing abutment of the valve member on the channel socket is ensured. Since the angular position of the valve member changes as a function of the pivot position of the connection part, it is advantageous for an at least largely sealing effect between valve member and discharge opening for the end surface of the channel socket, which is penetrated by the discharge opening, to be congruent to a surface of the valve member in the closure position in the closure position of the valve device. It is particularly preferred for the end surface to be designed flat, in particular circular, and for the surface of the valve member to also be designed flat such that the desired extensive abutment of the valve member on the end surface is ensured.

In a further configuration of the invention, the connection part has a valve member tab which is partially released from the connection part, in particular by means of a U-shaped recess, on which valve member tab the valve member arranged opposite the channel socket is located and which valve member tab is designed for an elastic relative movement of the valve member with respect to the connection part when it is supported on the channel socket. By way of the release, which can be introduced into the connection part for example as a curved slot, a variation, in regions, of the elasticity of the connection part can be achieved. The connection part is essentially designed in a dimensionally-stable manner such that it is not deformed elastically or plastically in any way in the context of operation of the valve device, which would lead to impairment of the valve function for the valve device. In contrast, a local enlargement of the elasticity is enabled for the valve tab by way of the release of the valve member tab such that improved abutment of the valve member on the channel socket can be hereby ensured, whereby manufacture tolerances of the connection part and of the valve housing can be at least partly balanced out. An improved sealing effect is hereby achieved for the valve member abutting on the channel socket in the closure position of the valve device without costly measures being required for this. The valve member lifting off the channel socket is also hereby reduced in the case of the effect of external accelerations and improves fatigue strength for the valve member since hard impact of the valve member on the channel socket during the closure operation is prevented. The release is particularly preferably designed as a U-shaped recess, wherein the valve member is arranged at a free end region of the valve member tab in order to be able to utilise the maximum elasticity of the valve member tab.

The connection part is preferably designed as a printed circuit with electric conductor tracks and/or the connection part is fixed on the valve housing with at least two flexures electrically insulated from each other, which serve for electric supply of the armature. The connection part can be designed as a printed circuit, preferably as a dimensionally-stable or flexible printed circuit board (PCB); in particular as a resin-saturated, fibre-reinforced board (FR4) or as a plastic carrier with conductor tracks, which are manufactured using a moulded interconnect device—injection-moulded circuit carrier. Additional electric and/or electronic components can thus be arranged between the at least one flexure and the armature, which serve in particular as a control circuit or a voltage limitation circuit for the armature. The armature can hereby be operated in a targeted manner as a function of the provided electric supply energy. A voltage limitation circuit or protection circuit serves to limit an amount of electric energy supplied in the armature in order to meet safety requirements, as required for example with explosion-proof devices. Additionally or alternatively, at least two flexures electrically insulated from each other are formed between the valve housing and the connection part such that an electric supply of the armature can be ensured exclusively via the flexure.

In an advantageous further development of the invention, the armature is designed as an electric coil arrangement which has a coil body fixed on the connection part and a coil winding applied to the coil body and the stator has a magnet group with at least one permanent magnet and at least one flux conductor in order to form an electrodynamic drive. Accordingly, the electric drive device is provided to utilise Lorenz forces which result from an interaction of a conductor supplied with current with an external magnetic field. To this end, an electric current can be applied to the coil winding as a function of a predefinable pivot position of the connection part, said electric current enters into interaction with the magnetic field of the at least one permanent magnet and leads to the Lorenz forces, which effect the pivot movement of the connection part. In order to achieve a compact construction for the valve device, it is advantageous for a flux conductor to be assigned to the at least one permanent magnet by means of whose aid a concentration of the magnetic flow provided by the permanent magnet can be achieved in the direction of winding levels of the individual windings of the coil arrangement.

It is advantageous for the coil body to have a preferably cylindrically-designed, in particular metallic sleeve section to receive the coil winding and an electrically-insulating mounting ring adjoining the sleeve section on the end face in order to be fixed on the connection part, the mounting ring having contact pins preferably protruding tangentially and connected to tappings of the coil winding for electrical contact with the connection part. By way of the configuration of the coil body as a sleeve section, a plunger coil arrangement can be provided together with the at least one permanent magnet and the assigned flux conductor, in said arrangement the sleeve section surrounds the permanent magnet and/or the flux conductor at least in regions and is possibly surrounded at least in regions by the permanent magnet and/or by the flux conductor. A particularly compact and high-performance electric drive device can hereby be provided. It may be advantageous as a function of the electric wiring of the electric coil arrangement to design the sleeve section from a metallic material. As a result, self-induced eddy currents occur in the sleeve section in the case of acceleration imposed externally on the valve device and a movement of the coil arrangement resulting therefrom, through which an inherent damping effect is caused for the coil arrangement. Vibrations, which are excited by the fluid impinging upon the valve member, can thus in particular be dampened.

The coil windings are preferably formed by an electrically-insulated coil wire, in particular an enamelled copper wire which is accordingly also sufficiently insulated with respect to the metallic sleeve section. The electrically-insulating mounting ring is provided for mechanical coupling of the sleeve section to the connection part, said mounting ring is optionally arranged on a surface of the connection part or penetrates the connection part and is possibly locked in a positive-locking manner with the connection part. The mounting ring has at least two electrically-conducting contact pins for electrically contacting the coil winding designed on the coil body. The contact pins are in electric contact with the electric conductor tracks on the connection part, in particular by soldering. The tappings of the coil winding, i.e. the wire ends of the coil wire, are preferably arranged directly on the contact pins. The contact pins are preferably arranged tangentially to the coil winding. The tangentially protruding contact pins are particularly preferably aligned parallel to each other in order to ensure a compact arrangement on the connection part.

The permanent magnet is preferably designed as a ring magnet with an axially aligned magnetic field and the flux conductor designed in particular rotationally-symmetric is preferably designed for deflecting the magnetic field into a radial direction. Due to the axial magnetisation, the ring magnet can be manufactured cost-effectively. The object of the flux conductor is to deflect the axial magnetic field of the ring magnet into a radial direction so that the field lines of the permanent magnet are aligned at least substantially perpendicular to a centre axis of the coil arrangement. This ensures that the Lorenz force resulting from the magnetic field and the current flow through the coil windings is aligned parallel to a centre axis of the coil arrangement.

It is advantageous for the armature and the stator to form a ring gap in which a damping fluid, in particular a ferrofluid is introduced for damping the valve movement. By way of this measure, damping should be achieved for the movement of the valve member, in particular in order to avoid movements of the valve member in the case of accelerations imposed externally. To this end, a viscous damping fluid, in particular based on silicon, can be introduced into the ring gap between armature and stator. The ring gap is particularly preferably filled with a ferrofluid, which remains in the ring gap due to the magnetic interaction with the at least one permanent magnet such that contamination of the environment of the ring gap by the damping fluid can be largely ruled out.

In a further configuration of the invention, the flexure determines a pivot axis and the connection part is extended on both sides of the pivot axis and is provided with the armature and a counterweight at opposing end regions so that a focal point of the connection part is arranged on the pivot axis. By way of this measure, changes of the valve position can be at least largely avoided for the valve device when external accelerations occur since balancing of moments is ensured in each spatial direction for the connection part.

In a further configuration of the invention, a distance from the pivot axis to the centre axis corresponds to at least a distance between the pivot axis and the valve member tab, preferably at least twice and at most eight times, in particular four times the distance between the pivot axis and the valve member tab. An advantageous ratio is ensured between a closure force required for the sealing support of the valve member tab on the inlet nozzle and an energy requirement of the coil arrangement necessary for this in order to apply this closure force.

BRIEF DESCRIPTION OF THE DRAWINGS

An advantageous embodiment of the invention is represented in the drawings.

DETAILED DESCRIPTION

Figure 1:
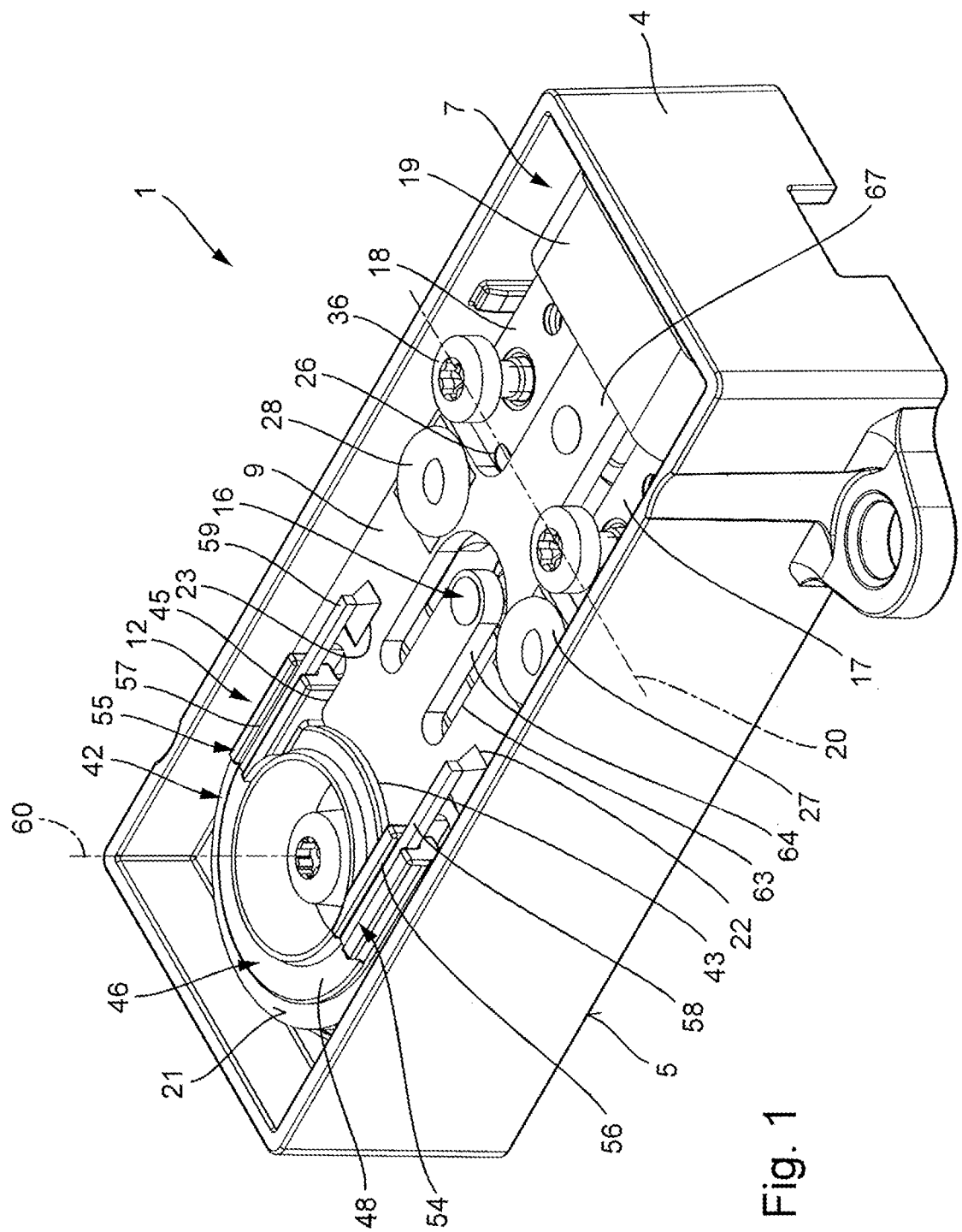
FIG. 1 shows a perspective representation of a valve device, a representation of a covering for the valve housing being dispensed with in order to represent the structure of the valve device.
Figure 2:
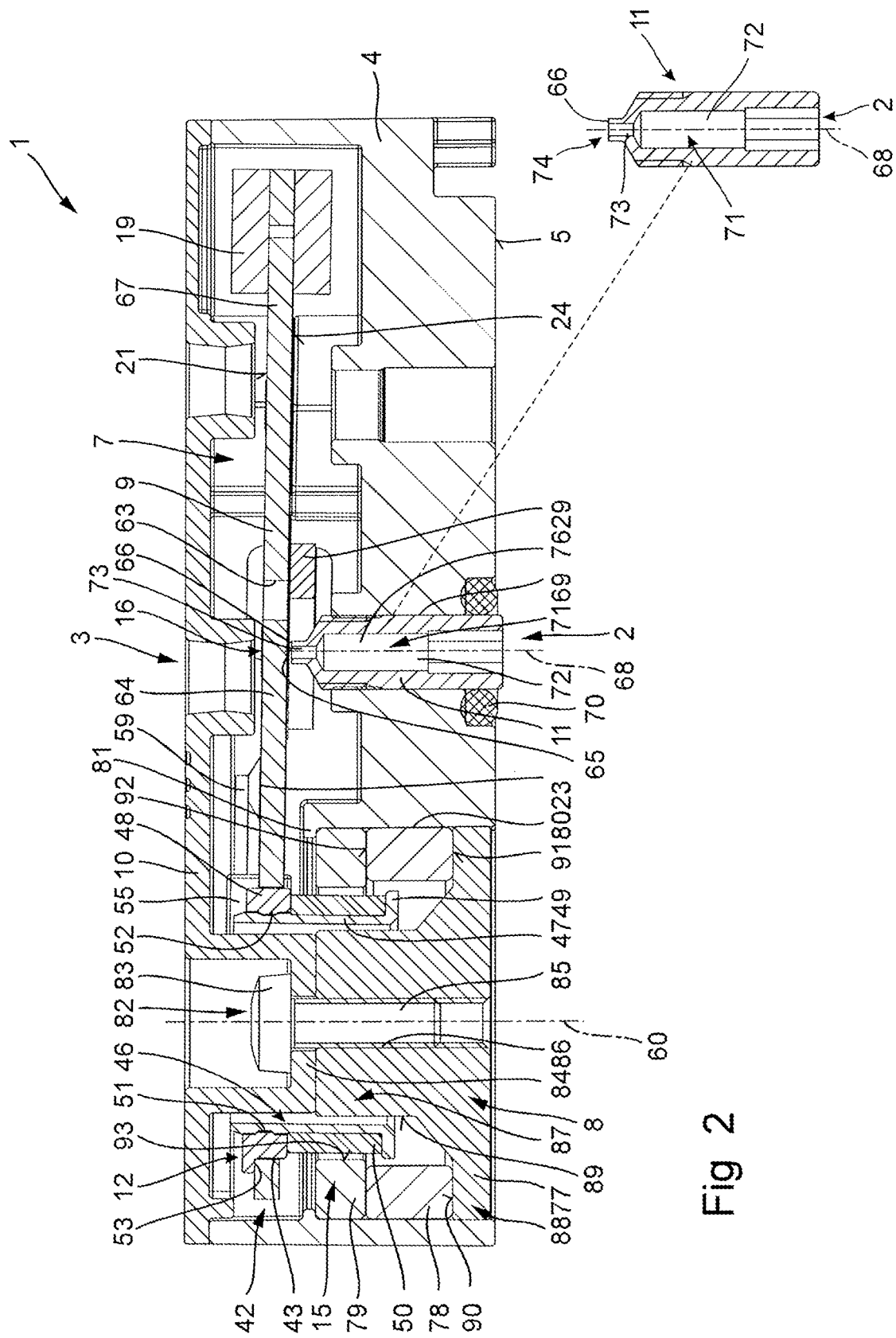
FIG. 2 shows a sectional representation for the valve device according to FIG. 1.
Figure 3:
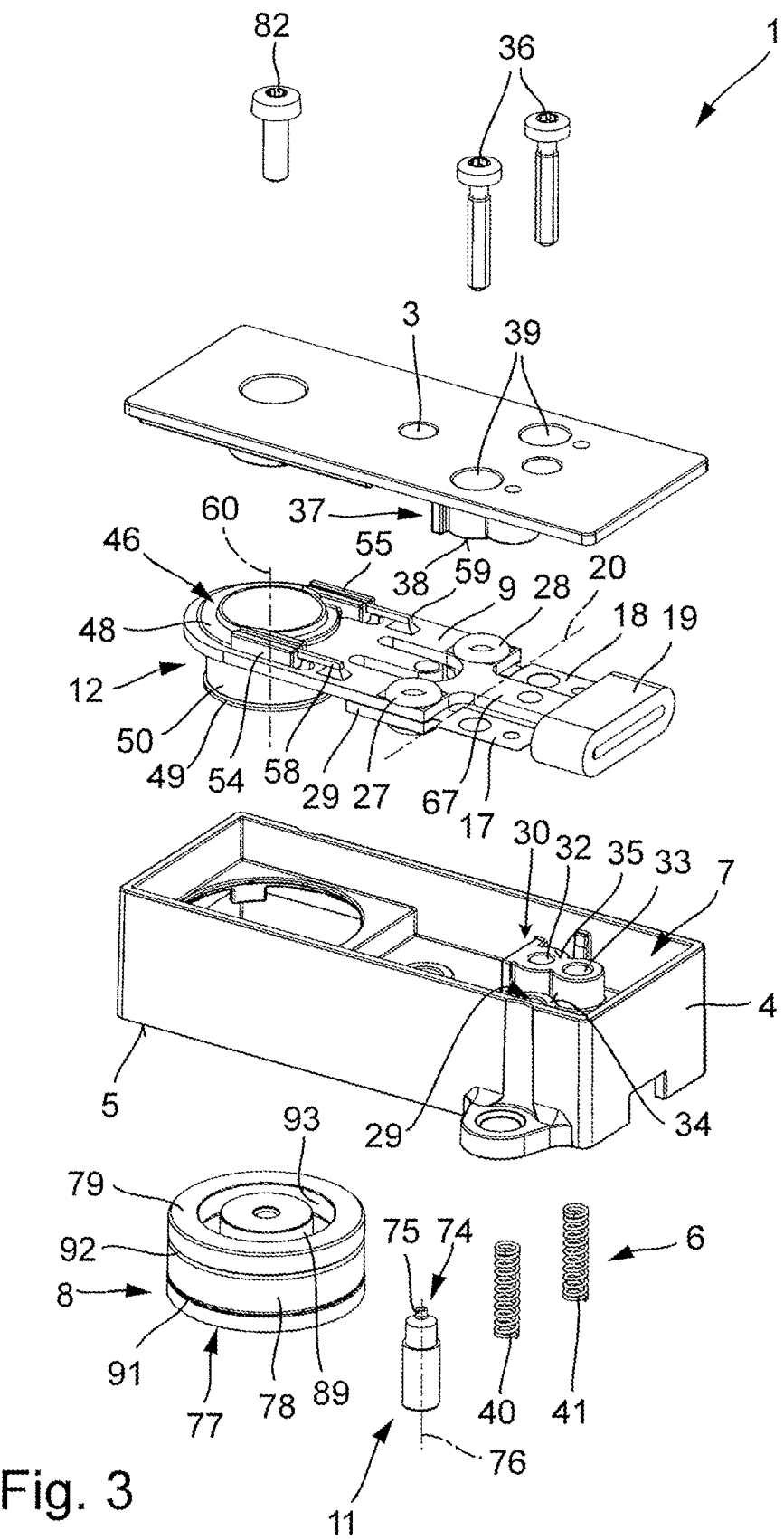
FIG. 3 shows a perspective exploded representation for the valve device according to FIGS. 1 and 2.
Figure 4:
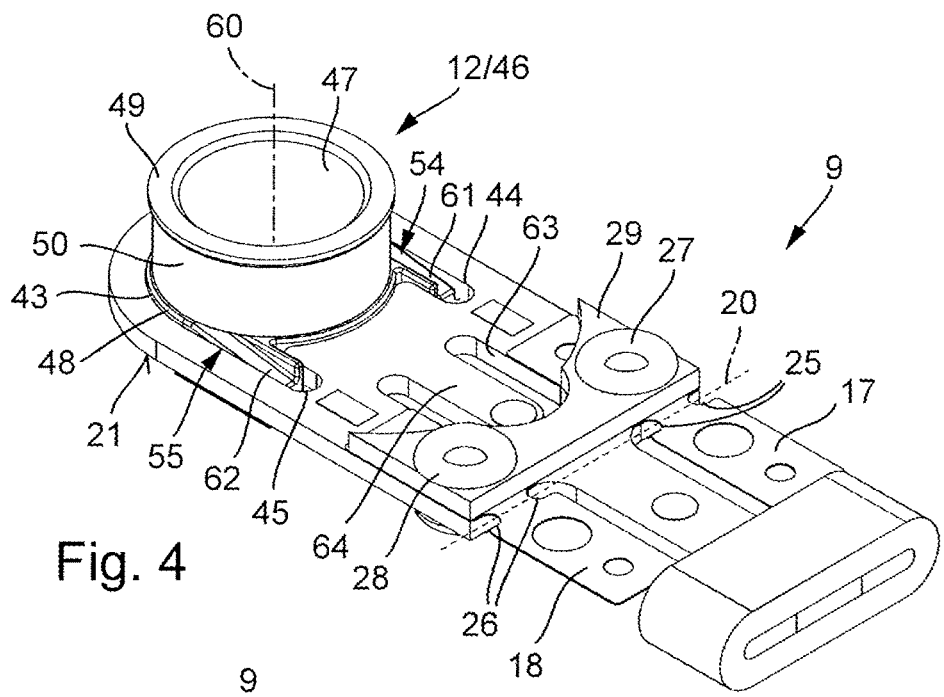
FIG. 4 shows a perspective representation of a connection part of the valve device.
Figure 5:
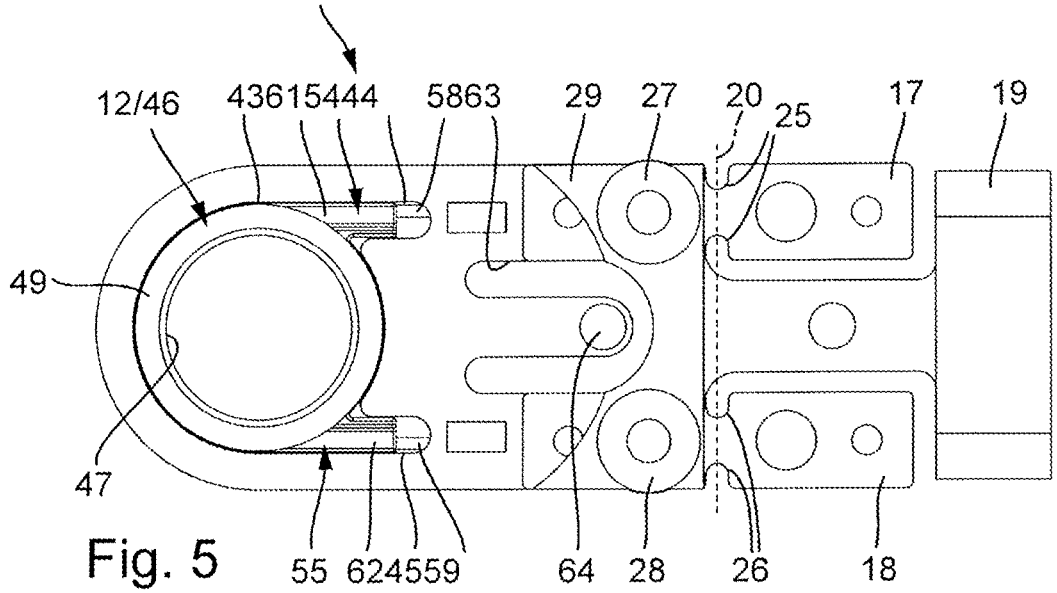
FIG. 5 shows a plan view on the connection part according to FIG. 4.
Figure 6:
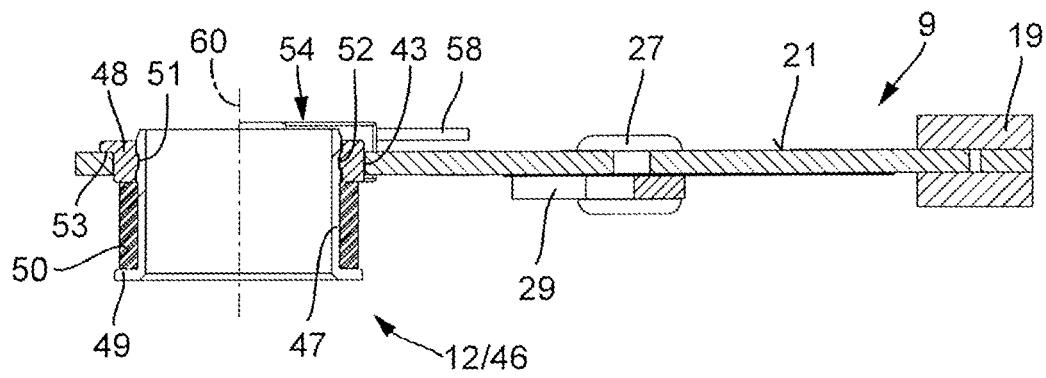
FIG. 6 shows a sectional representation of the connection part according to FIGS. 4 and 5.

A valve device 1 represented in FIGS. 1 to 3 in different views is designed to influence a fluid current of a preferably gaseous fluid, in particular pressurised air between an inlet connection 2 and an outlet opening 3. For example, the valve device 1 is used as a pilot control valve for a main valve not represented, whose pilot control is carried out as a function of a differential pressure provided by the valve device 1. In the case of such use for the valve device 1, the outlet opening 3 is only designed as an outlet without connection means for a fluid hose at which the preferably pneumatic fluid current can escape into the environment.

The valve device 1 has a valve housing 4, which is designed, purely for example, to be mounted on a base plate, not represented, both provision of a fluid current at the inlet connection 2 and provision of electric supply energy being provided via the base plate. Accordingly, the inlet connection 1 is arranged, purely for example, at an underside 5 of the valve housing 4. Similarly, purely for example, connection means 6, described in detail below, are also arranged on the underside 5 in order to be brought into an electric connection with the base plate, not represented.

The valve housing 4 manufactured for example in a plastic injection moulding process or in a generative manufacturing process (3D printing) is, purely for example, designed with a square outer geometry. The valve housing 4 has a recess designated as a valve space 7 and serves as a second fluid channel section, in said recess are arranged the components of the valve device 1 described in detail below.

As can be seen from the representations of FIGS. 2 and 3, the components: stator 8, connection part 9 and inlet nozzle 11 are arranged in the valve space 7. In this case, both the stator 8 and the connection part 9 are manufactured from a plurality of individual parts, which are described in detail below. The inlet nozzle 11 is, purely for example, designed for a screw connection with the valve housing 4, but can alternatively also be designed for a plug connection with the valve housing or integrally with the valve housing. The valve device 1 also has a row of further components, such as for example the covering 10.

The connection part 9 has a coil arrangement 12 which serves as an armature of an electric, in particular electrodynamic drive device 15. The connection part 9 also comprises a valve member 16, which adopts a variable distance with respect to the inlet nozzle 11 during a pivot movement of the connection part 9 and can thus influence a fluid through the inlet nozzle 11. Two flexures 17, 18 are also designed, purely for example, on the connection part 9, said flexures are used for play-free pivot bearing of the connection part 9 with respect to the valve housing 4. Furthermore, a counterweight 19 is arranged on the connection part 9, said counterweight ensures there is no torque for the connection part 9 in relation to a pivot axis 20 determined by the two flexures 17 and 18.

Purely for example, the connection part 9 is designed as a printed circuit with electric conductor tracks not represented in detail. The conductor tracks are provided at least for an electric connection between at least one of the flexures 17 and/or 18, which are designed in an electrically-conductive manner, in particular made of a metallic material and two contact surfaces 22, 23 arranged on an upper side 21 of the connection part 9. Electric or electronic components, not represented in detail, are also arranged on the upper side 21 and/or on a lower side 24 of the connection part 9, said components are, in particular, electrically looped into an electric connection between one of the flexures 17 or 18 and the contact surfaces 22 or 23 in order to implement pre-definable electric or electronic functions for the coil arrangement 12.

For example, the flexures 17 and 18 are designed as narrow strips made of a spring steel sheet. For a clear definition of the pivot axis 20, each of the flexures 17, 18 has two opposingly arranged punch-outs 25, 26. The punch-outs 25, 26 determine the area of the respective flexure 17, 18 at which there is maximum elasticity, while adjoining regions of the flexures 17, 18, in contrast, have high rigidity. The two flexures 17, 18 are, purely for example, fixed in a positive-locking manner on the connection part 9. To this end, the flexures 17, 18 are fixed by means of a tubular rivet 27, 28 on the connection part. Purely for example, the flexures 17, 18 abut extensively on the underside 24 of the connection part 9 and an additional support part 29 in particular designed as a circuit board section is provided, which is also penetrated by the respective tubular rivet 27 and 28. Accordingly, the flexures 17, 18 are received between the connection part 9 and the support part 29.

The flexures 17, 18 also rest with an end region facing away from the support part 29 on support posts 30, 31 of the valve housing 4, which protrude into the valve space 7 and which, purely for example, are penetrated by two recesses 32, 33. The two recesses 32, 33 discharge at a surface 34, 35 of the support posts 30, 31 designed flat, purely for example. The recess 32 is provided to receive a fastening screw 36 which penetrates a counter holder 37 protruding into the valve space 7 designed on the covering 10, said counter holder is designed for extensive abutment on the flexure 17 or 18. Since the fastening screw 36 rests on a bundled coil of the counter holder 37 not represented and the covering 10 is not represented in FIG. 1, the fastening screws 36 have a distance with respect to the flexures 17 and 18, to which the thickness of the bundled coil corresponds. Alternatively, the screw heads of the fastening screws 36 rest directly on the flexures 17, 18 and fastening of the covering 10 on the valve housing 4 is carried out in another manner.

An underside 38 of the counter holder 37 facing the respective flexure 17, 18 is preferably also designed flat such that the respective flexure 17, 18 is received extensively between the respective support post 30, 32 and the opposing counter holder 37. As can be seen from the representation of FIG. 3, the covering 10 and the counter holder 37 connected thereto are penetrated by a recess 39 which serves to receive the screw head of the fastening screw 36. An additional recess discharging at the underside 38 and not represented, adjoins this recess, said additional recess is slightly larger than the shaft of the respective fastening screw 36. This recess determines the bundled coil, which serves as a support for the screw head of the fastening screw 36 and thus ensures the force transfer from the fastening screw 36 via the covering 10 to the respective flexure 17, 18 into the valve housing 4.

The second recess 33 provided, purely for example, in the respective support posts 30, 31 serves to receive a contact spring 40, 41, which extends in the mounted state from the respective flexure 17, 18 to the underside 5 of the valve housing 4. The function of the contact springs 40, 41 is the electric coupling of the respective flexure 17, 18 to an electrically-conductive connection surface, not represented, of the base plate, also not represented. A diameter of the recess 33 is preferably selected to be slightly greater than a diameter of the respective contact spring 40, 41 such that the respective contact spring 40, 41 enters into direct, electrically-conductive abutment with the respective flexure 17, 18.

A circular recess 43 is formed at a first end region 42 of the connection part 9 facing away from the flexure 17, 18, which, purely for example, has two tangential slots 44, 45 aligned parallel to each other. The recess 43 and the tangential slots 44, 45 connected thereto are designed to receive the coil arrangement 12, which, according to the representations of the FIGS. 2, 4, 5 and 6, has a coil body 46. For example, the coil body 46 is formed of a metallic sleeve section 47 as well as a mounting ring 48 snapped onto the sleeve section 47, said mounting ring is manufactured from an electrically-insulating material, in particular plastic. The sleeve section 47 has circumferential collar 49 protruding radially outwards at an end region facing away from the mounting ring 48, said collar forms an axial delimitation for a receiving area for the coil winding 50 together with the mounting ring 48 protruding from the sleeve section 47 outwards in a radial direction. A circumferential groove 51 recessed radial inwards is preferably formed on the sleeve section 47 into which a corresponding, circumferential projection 52 of the mounting ring 48 engages in a positive-locking manner. The mounting ring 48 is also matched to the recess 43 such that a support surface 53 forming a circular section at least in regions is provided, by means of which precise alignment of the coil body 46 with respect to the connection part 9 is ensured.

The mounting ring 48 also has two contact holders 54, 55 aligned for example parallel to each other and arranged tangential to the sleeve section 47. Each of the contact holders 54, 55 is provided at an upper side represented in FIG. 1 with a groove 56, 57 aligned tangential to the sleeve section 47, in which a contact pin 58, 59 designed in an electrically-conductive manner is fixed, in particular in a positive-locking and/or materially-bonded manner. Each of the contact pins 58, 59 protrudes over the respective contact holder 54, 55 and is designed for a materially-bonded, electric connection, preferably manufactured by soldering, to the contact surfaces 22, 23 of the connection part 9. On a surface facing away from the grooves 56, 57, the contact holders 54, 55 also have a ramp surface 61, 62 aligned inclined to a centre axis 60 of the sleeve section 47 and the mounting ring 48, said ramp surface serving to support the coil wire, not represented in detail, between the coil winding 50 and the respective contact pin 58, 59. The coil wire, not represented, is preferably guided via the respective ramp surface 61, 62 to the respective contact pin 58, 59 and the mechanical connection between coil wire and contact pin 58, 59 is initially established there by repeatedly winding the contact pin 58, 59. The coil wire is preferably soldered or welded with the respective contact pin 58, 59 in order to hereby achieve a secure electric connection between coil wire and contact pin 58, 59.

A distance from the pivot axis 20 to the centre axis 60 is for example four times greater than a distance between the pivot axis 20 and the valve member tab 64, whereby an advantageous ratio between a closure force required for the sealing support of the valve member tab 64 on the inlet nozzle 11 and an energy requirement of the coil arrangement 12 necessary for this is ensured in order to apply this closure force.

In a central region of the connection part 9, a U-shaped recess 63 is provided, purely for example, the U legs of which are for example aligned parallel to each other and in the direction of the coil body 46. A valve member tab 64 is formed by the recess 63 on the connection part 9, which, purely for example, has a flat surface 65 at an end region, which is arranged in a mounted state of the connection part 9 opposite an end surface 66 of the inlet nozzle 11. The valve member tab 64 has increased elasticity with respect to the surrounding connection part 9 by way of the U-shaped recess 63 such that an elastic relative movement of the valve member tab 64 with respect to the connection part 9 can be achieved for a reliable sealing abutment on the inlet nozzle 11.

An extension 67 designed, purely for example, in a strip manner extends between the two flexures 17, 18 as a second end region of the connection part 9, which protrudes over the two flexures 17, 18 in a direction transverse to the pivot axis 20. The extension 67 is provided with a counterweight 19 profiled in an oval manner, purely for example. The counterweight 19 is for example manufactured from a tubular section of a metallic material, which is preformed for example initially in a first step in order to adopt the oval shape at least as far as possible and is then pressed onto the extension 67 by additional plastic deformations in a subsequent mounting step. A torque exerted by the counterweight 19 in relation to the pivot axis 20 as a function of the spatial position of the valve device 1 corresponds to a torque of the coil body 46 provided as a function of the spatial position of the valve device 1 in relation to the pivot axis 20. This causes the connection part 9 to be received in a torque-free manner into the valve housing 4 following mounting and it thus also experiences no relevant, undesired deflections when external accelerations occur.

The inlet nozzle 11 is, purely for example, designed rotationally-symmetric and delimits a first section 68 of the fluid channel. The inlet nozzle 11 is, purely for example, screwed into a recess 69 of the valve housing 4 and is sealed at the end face with a sealing ring 70 with respect to the valve housing 4. The inlet nozzle 11 is penetrated by a stepped bore 71, a first section 72 of the stepped bore being designed to receive a connection support, not represented, for a fluid supply, while a second section 73 of the stepped bore 71 has a significantly smaller diameter than the first section 72 and discharges as a discharge opening 74 at the end surface 66 of the inlet nozzle 11. Since the inlet nozzle 11 is for example received in a screwable manner in the recess 69, the end surface 66 is aligned normal to a centre axis 76. The inlet nozzle 11 is also adapted to the valve member tab 64 such that the flat surface 65 of the valve member tab 64 can be extensively supported on the end surface 66. A regulate distance between the valve member tab 65 and the inlet nozzle 11 determines the flow resistance for a fluid provided at the inlet connection 2 and discharging at the outlet opening 3. An alignment of the flat surface 65 of the valve member tab 64 in the opening position of the valve member tab 64 is preferably selected such that the flat surface 65 forms an acute angle with the end surface 66 of the inlet nozzle 11, which corresponds to the pivot angle, which the valve member tab 64 moves over between the opening position and the closure position such that an advantageous sealing effect is ensured in the closure position between valve member tab 64 and inlet nozzle 11. This inclined position of the valve member tab 64 with respect to the inlet nozzle 11 in the opening position of the valve member 16 can for example be achieved by an inclined alignment of the surfaces, not denoted in detail, of the support posts 30, 31 of the valve housing 4, in this case, the two flexures 17, 18 are designed as flat parallel plates. Alternatively, the flexures 17, 18 can be designed bent along the pivot axis in order to hereby ensure the desired inclined position for the flat surface 65 of the valve member tab 64 in the opening position of the valve member tab 64.

The inlet nozzle 11 is, for example, designed in an electrically-conductive manner, in particular it is manufactured from a metallic material and can be coupled to an electric voltage source for adjustment purposes. The valve member 64 is also designed in an electrically-conductive manner and is in electrically-conductive connection with one of the flexures 17, 18. A current flow from the inlet nozzle 11 to the flexure 17, 18 and from there to an electric connection of the valve device 1, not represented, can thus take place for the case of a mechanical and electric contact between inlet nozzle 11 and valve member 64 such that regulating of the closure position for the valve member 64 can thereby be carried out.

A (pilot) control function for a main valve, not represented, coupled to the valve device 1 and fluidically pilot-controlled can hereby be ensured.

The stator 8 is, purely for example, composed of components that are designed so as to be rotationally-symmetric and has a first flux conductor 77, a permanent magnet 78 designed as a ring magnet and a second flux conductor 79.

As can be seen from the sectional representation of FIG. 2, the stator 8 is received in a recess 80 of the valve housing 4, which extends upwards from an underside 5 of the valve housing 4 and is delimited at the end face by a circumferential bundled coil 81, which serves for the abutment of the stator 8. The stator 8 is fixed, purely for example, by means of a fastening screw 82, whose screw head 83 rests on a bundled coil 84 of the covering 10, while a shaft section 85 of the fastening screw 82 penetrates the bundled coil 84 of the covering 10 and is screwed into a centre bore of the first flux conductor 77.

The first flux conductor 77 has, for example, a first flux conduction area 87 designed in a circular-cylindrical manner as well as a second flux conduction area 88 designed as a circumferential bundled coil and adjoined thereto. In this case, an outer surface 89 of the first flux conduction area designed in a cylindrical surface shape is arranged opposite the sleeve section 47 of the coil body 46 and penetrates it at least in regions. In contrast, a circular surface 90 of the second flux conduction area 88 serves as a support for the permanent magnet 78 arranged, purely for example, coaxially to the first flux conductor 77. For example, the permanent magnet 78 is magnetised in the axial direction such that maximum flow densities of the permanent magnet 78 are present at the end faces 91, 92 designed in a circular manner.

The second flux conductor 79, designed in a circular manner, rests on the end face 92 of the permanent magnet 78, said second flux conductor is also arranged coaxially to the first flux conductor 77 and which is provided for deflection of the axially-aligned magnetic field of the permanent magnet 78 into a radial alignment. Similarly, the first flux conductor 77 also serves for the diversion of the axially-aligned magnetic flow of the permanent magnet 78 into a radial direction. Accordingly, an air gap forms between an inner surface 93 of the second flux conductor 79 and the outer surface 89 of the first flux conductor area 87, said air gap is penetrated by a radially-running magnetic field, in which the coil winding of the coil arrangement 12 is arranged. This ensures that the Lorenz forces can form when the coil winding 50 is energised, said forces act in relation to the centre axis 60 of the coil winding 50 at least virtually parallel to the centre axis 60. Accordingly, the connection part 9 can be deflected around the pivot axis 20 from the position represented in FIG. 2 by a pivot movement when the coil winding 50 is energised.

For example, a viscous damping fluid, not represented in detail, is introduced in the air gap formed between the inner surface 93 of the second flux conductor 79 and the outer surface 89 of the first flux conductor 87 in order to ensure damping of the movement of the connection part 9, which can, for example, be caused by accelerations imposed externally and/or by pressure fluctuations of the fluid provided at the inlet connection 2.

The counterweight 19 ensures at least virtually a balancing of moments in relation to the pivot axis 20 such that only small forces are required for a movement of the connection part 9. Accordingly, an amount of energy supplied in the electric drive device 15 is also very limited such that requirements for explosion protection can be met without complex additional measures. This applies, in particular when one or a plurality of freewheeling diodes, not represented in detail, are assigned to the coil winding 50, which ensure defined dissipation of the electric energy in the case of self-inductance of the coil winding 50, as can occur by suddenly switching off a supply voltage or by relative movements with respect to the stator 8.

The sleeve section 47 designed in an electrically-conductive manner, on which the coil winding 50 is wound, serves as a damping element since a magnetic coupling with the coil winding 50 is ensured and a current flow in the sleeve section 47 is caused when the electric current supply for the coil winding 50 is switched off or when there is an interruption (wire break) in the coil winding, which counteracts a sudden breakdown of the coil field and thus effectively prevents the occurrence of high electric voltage peaks in the coil winding 50.

The material of the valve housing 4 preferably has a similar expansion coefficient to the connection part 9 such that thermal influences on the valve device 1 disappear at least within a predefinable temperature interval.

What is claimed is:

1. A valve device for influencing a fluid current between an inlet connection and an outlet opening, with a valve housing, which is penetrated by a fluid channel, which extends from the inlet connection to the outlet opening, wherein a valve member is arranged in the fluid channel, which is designed to regulate a cross-section of the fluid channel, with an electric drive device, which is designed to influence a position of the valve member in the fluid channel and which comprises a stator that is fixed on the valve housing and an armature arranged so as to be movable relative to the stator, wherein the armature and the valve member are arranged on a dimensionally-stable connection part, the connection part being pivotably mounted on the valve housing with at least one flexure, wherein the at least one flexure provides an electric connection of the armature to an electric connection device provided on the valve housing and wherein the connection part forms the valve member or carries the valve member, and wherein a first section of the fluid channel comprises a recess proceeding from the inlet connection in a channel socket, the channel socket protruding into a valve space and having a discharge opening arranged opposite the valve member and wherein a second section of the fluid channel comprises a valve space in which the drive device, the connection part, the valve member and the at least one flexure are arranged and into which the channel socket protrudes, and wherein the connection part has a valve member tab which is partially released from the connection part and on which the valve member, which is arranged opposite the channel socket, is located and which the valve member tab facilitates an elastic relative movement of the valve member with respect to the connection part when the valve member is supported on the channel socket.

2. The valve device according to claim 1, wherein the connection part is fixed on the valve housing with at least two flexures electrically insulated from each other, which serve for the electric supply of the armature.

3. The valve device according to claim 1, wherein the flexure determines a pivot axis and wherein the connection part is extended on both sides of the pivot axis and is provided with the armature and a counterweight at opposing end regions so that a focal point of the connection part is arranged on the pivot axis.

4. The valve device according to claim 1, wherein the flexure determines a pivot axis and wherein the connection part is extended on both sides of the pivot axis, and wherein the armature determines a center axis, the armature and a counterweight being disposed at opposing end regions so that a focal point of the connection part is arranged on the pivot axis, and wherein a distance from the pivot axis to the center axis corresponds to at least a distance between the pivot axis and the valve member tab.

5. A valve device for influencing a fluid current between an inlet connection and an outlet opening, with a valve housing, which is penetrated by a fluid channel, which extends from the inlet connection to the outlet opening, wherein a valve member is arranged in the fluid channel, which is designed to regulate a cross-section of the fluid channel, with an electric drive device, which is designed to influence a position of the valve member in the fluid channel and which comprises a stator that is fixed on the valve housing and an armature arranged so as to be movable relative to the stator, wherein the armature and the valve member are arranged on a dimensionally-stable connection part, the connection part being pivotably mounted on the valve housing with at least one flexure, wherein the at least one flexure provides an electric connection of the armature to an electric connection device provided on the valve housing and wherein the connection part forms the valve member or carries the valve member, and wherein the armature comprises an electric coil arrangement which has a coil body fixed on the connection part and a coil winding applied to the coil body and wherein the stator has a magnet group with at least one permanent magnet and at least one flux conductor in order to form an electrodynamic drive.

6. The valve device according to claim 5, wherein a first section of the fluid channel comprises a recess proceeding from the inlet connection in a channel socket, the channel socket protruding into a valve space and having a discharge opening arranged opposite the valve member and wherein a second section of the fluid channel comprises a valve space in which the drive device, the connection part, the valve member and the at least one flexure are arranged and into which the channel socket protrudes.

7. The valve device according to claim 6, wherein an end surface of the channel socket arranged opposite the valve member and penetrated by the discharge opening is adapted to the pivotable valve member such that an sealing abutment of the valve member on the channel socket is ensured in a closure position of the valve member.

8. The valve device according to claim 5, wherein the coil body comprises a sleeve section to receive the coil winding and an electrically-insulating mounting ring adjoining the sleeve section on the end face in order to be fixed on the connection part, wherein the mounting ring has contact pins connected to tappings of the coil winding for electrical contact with the connection part.

9. The valve device according to claim 5, wherein the permanent magnet is a ring magnet with an axially aligned magnetic field and wherein the flux conductor deflects the magnetic field into a radial direction.

10. The valve device according to claim 5, wherein the armature and the stator form a ring gap in which a damping fluid is located for damping the valve movement.

* * * * *